United States Patent
Charlebois et al.

(10) Patent No.: US 7,886,253 B2
(45) Date of Patent: *Feb. 8, 2011

(54) DESIGN STRUCTURE FOR PERFORMING ITERATIVE SYNTHESIS OF AN INTEGRATED CIRCUIT DESIGN TO ATTAIN POWER CLOSURE

(75) Inventors: Steven E. Charlebois, Jericho, VT (US); Paul D. Kartschoke, Williston, VT (US); John J. Reilly, Huntington, VT (US); Manikandan Viswanath, South Burlington, VT (US)

(73) Assignee: International Business Machines Corporation, Armonk, NY (US)

(*) Notice: Subject to any disclaimer, the term of this patent is extended or adjusted under 35 U.S.C. 154(b) by 653 days.

This patent is subject to a terminal disclaimer.

(21) Appl. No.: 11/872,731

(22) Filed: Oct. 16, 2007

(65) Prior Publication Data
US 2009/0100398 A1    Apr. 16, 2009

(51) Int. Cl.
    *G06F 17/50* (2006.01)
(52) U.S. Cl. .................... 716/18; 716/1; 716/2; 716/12
(58) Field of Classification Search .................... 716/1, 716/2, 12, 18
    See application file for complete search history.

(56) References Cited

U.S. PATENT DOCUMENTS

| 5,537,330 A | 7/1996 | Damiano et al. |
| 6,038,381 A * | 3/2000 | Munch et al. .................... 716/1 |
| 6,397,170 B1 | 5/2002 | Dean et al. |
| 6,711,719 B2 | 3/2004 | Cohn et al. |
| 6,785,875 B2 | 8/2004 | Beerel et al. |
| 6,789,248 B1 | 9/2004 | Lu et al. |
| 6,952,816 B2 | 10/2005 | Gupta et al. |
| 7,539,968 B2 * | 5/2009 | Charlebois et al. ............ 716/18 |

OTHER PUBLICATIONS

Charlebois et al., U.S. Appl. No. 11/759,332, filed Jun. 7, 2007, Office Action Communication dated Nov. 14, 2008, 6 pages.
Charlebois et al., U.S. Appl. No. 11/759,332, filed Jun. 7, 2007, Notice of Allowance and Fee(s) Due dated Jan. 23, 2009, 4 pages.

* cited by examiner

*Primary Examiner*—Thuan Do
(74) *Attorney, Agent, or Firm*—David A. Cain; Hoffman Warnick LLC

(57) ABSTRACT

A design structure that performs iterative synthesis of an integrated circuit design to attain power closure is described. In one embodiment, the design structure is embodied in a computer readable medium and has the capability to initially synthesized an integrated circuit design to satisfy timing and power constraints. Results from the initial synthesis are fed back into the synthesis process where specific nodes in the circuit design are targeted to satisfy the timing and power constraints. Selected nodes in the circuit design are worked on in an iterative manner until it has been determined that all of selected nodes have undergone evaluation for satisfying timing and power constraints. Once all of the selected nodes have undergone evaluation for satisfying timing and power constraints, then a final netlist representing the circuit design is generated.

7 Claims, 4 Drawing Sheets

DESIGN STRUCTURE FOR PERFORMING ITERATIVE SYNTHESIS OF AN INTEGRATED CIRCUIT DESIGN TO ATTAIN POWER CLOSURE

CROSS-REFERENCE TO RELATED APPLICATIONS

This patent application is related in subject matter to U.S. patent application Ser. No. 11/759,332, filed Jun. 7, 2007.

BACKGROUND

This disclosure relates generally to integrated circuit design, and more specifically to a design structure that performs iterative synthesis of an integrated circuit design to attain power closure.

A typical integrated circuit design begins with a high-level circuit specification that details the function of the circuit design and the constraints of the design such as the area or physical size of the design, power dissipation, frequency, etc. The circuit function is translated to a logic design written in a hardware description language such as Very High Speed Integrated Circuit Hardware Description Language (VHDL). A synthesis tool generates or synthesizes a circuit or gate level design from the hardware description of the design. Because the initial synthesis seldom generates a design that satisfies the specified constraints, changes to the circuit design are necessary. These changes to the circuit design are made manually and can be time consuming, especially where there is a timing and power budget to satisfy. For example, changes made to the circuit design to alter its timing or area may adversely affect the power dissipation, leaving the circuit design over the power budget. Similarly, changes made to the circuit design to alter power dissipation may adversely affect the timing, leaving the circuit design not meeting the timing budget. In either case, several iterations of manual changes and measurements to determine how these changes affect existing design constraints, such as timing and power, are necessary before arriving at a design that satisfies the design constraints. An approach that can optimize an integrated circuit design for power while maintaining existing design constraints is presented.

SUMMARY

In one embodiment, there is a design structure embodied in a computer readable medium for performing an iterative synthesis of an integrated circuit design to attain power closure while maintaining other design criteria. In this embodiment, the design structure comprises: means for performing an initial synthesis of the integrated circuit design to generate a netlist containing a listing of circuits and interconnections that form the integrated circuit design; means for generating a tag list that specifies a tag for each node in the netlist; means for identifying a predetermined number of nodes from the netlist that are representative of worst case power consuming nodes; means for performing a power reduction algorithm on each of the predetermined number of nodes; means for calculating power of the netlist after each instance that a power reduction algorithm is run on a node selected from the predetermined number of nodes; means for determining after each instance that a power reduction algorithm is run on a node selected from the predetermined number of nodes whether the netlist satisfies design constraints specified for the integrated circuit design; means for using the tag list to iterate through the performing of a power reduction algorithm, calculating of power and determining whether the netlist satisfies specified design constraints for each of the predetermined number of nodes; and means for generating a final netlist after all of the predetermined number of nodes have been iterated through the performing of a power reduction algorithm, calculating of power and determining of whether the netlist satisfies specified design constraints.

DETAILED DESCRIPTION

Embodiments of this disclosure are directed to a technique for iteratively synthesizing an integrated circuit design for attaining power closure while maintaining existing design constraints. In one embodiment of this disclosure, the integrated circuit design is initially synthesized to satisfy timing and power constraints. Results from the initial synthesis are fed back into the synthesis process where specific nodes in the circuit design are targeted to satisfy the timing and power constraints. More specifically, selected nodes in the circuit design are worked on in an iterative manner until it has been determined that all of selected nodes have undergone evaluation for satisfying timing and power constraints. Once all of the selected nodes have undergone evaluation for satisfying timing and power constraints, a final netlist representing the circuit design is then generated.

Figure 1:
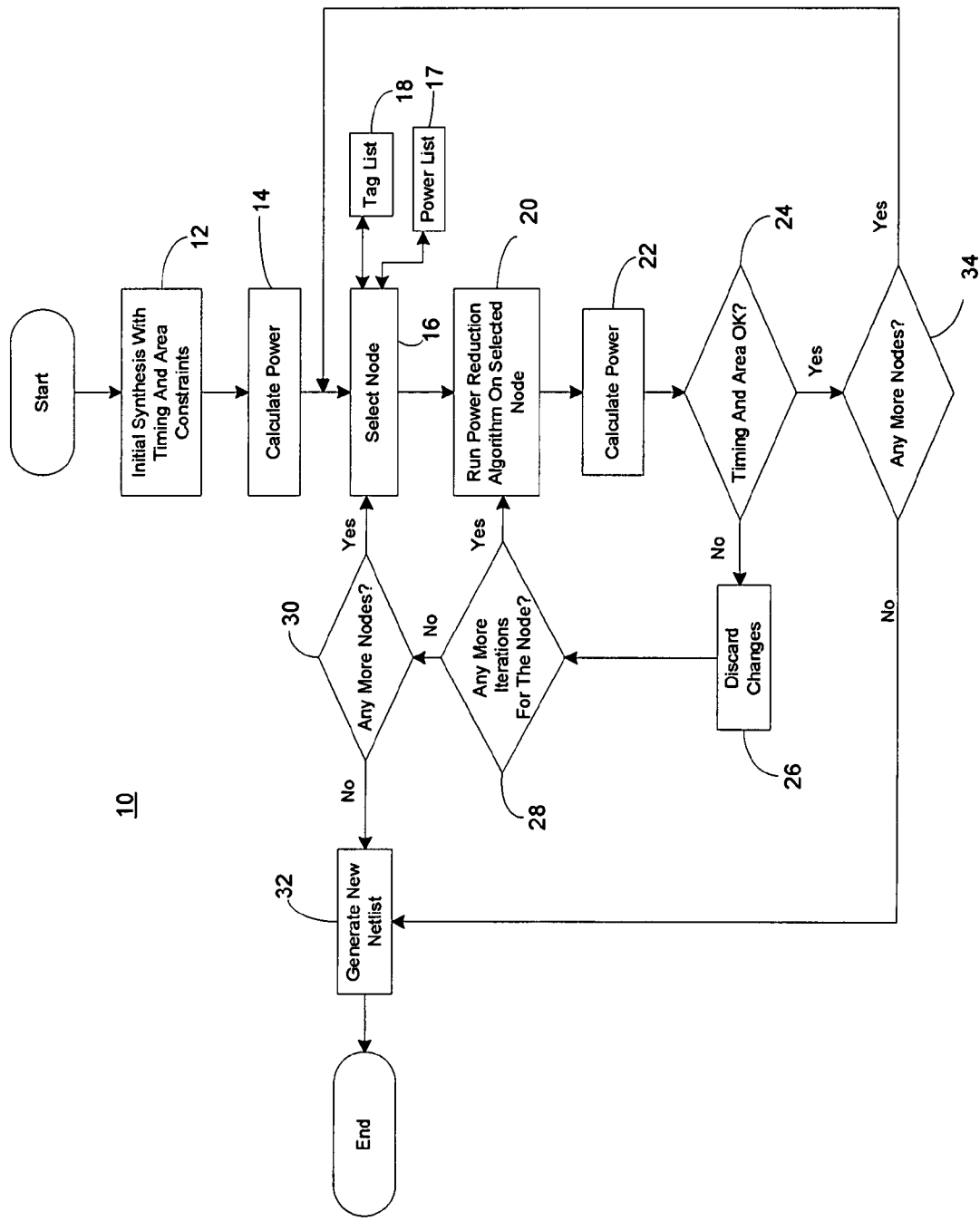
FIG. 1 shows a flow chart describing an iterative synthesis of an integrated circuit design to attain timing and power closure according to one embodiment of this disclosure.

FIG. 1 shows a flow chart describing a process 10 for performing an iterative synthesis of an integrated circuit design to power closure according to one embodiment. Although the description that follows is directed to attaining power closure while maintaining timing and area constraints, those skilled in the art will recognize that this power closure technique can be used with other design constraints besides timing and area such as testability and manufacturability.

Referring back to FIG. 1, at 12, the high-level circuit specification that details the function of circuit design is received in the form of VHDL. Area, power and timing constraints are given to a synthesis tool to design the gate-level netlist within the constraints. In particular, the initial synthesis performed at 12 generates a netlist containing a listing of circuits and interconnections that form the integrated circuit design. Although not shown in FIG. 1, the initial synthesis includes running a timing analysis on the netlist to determine if timing constraints are satisfied.

Figure 2:
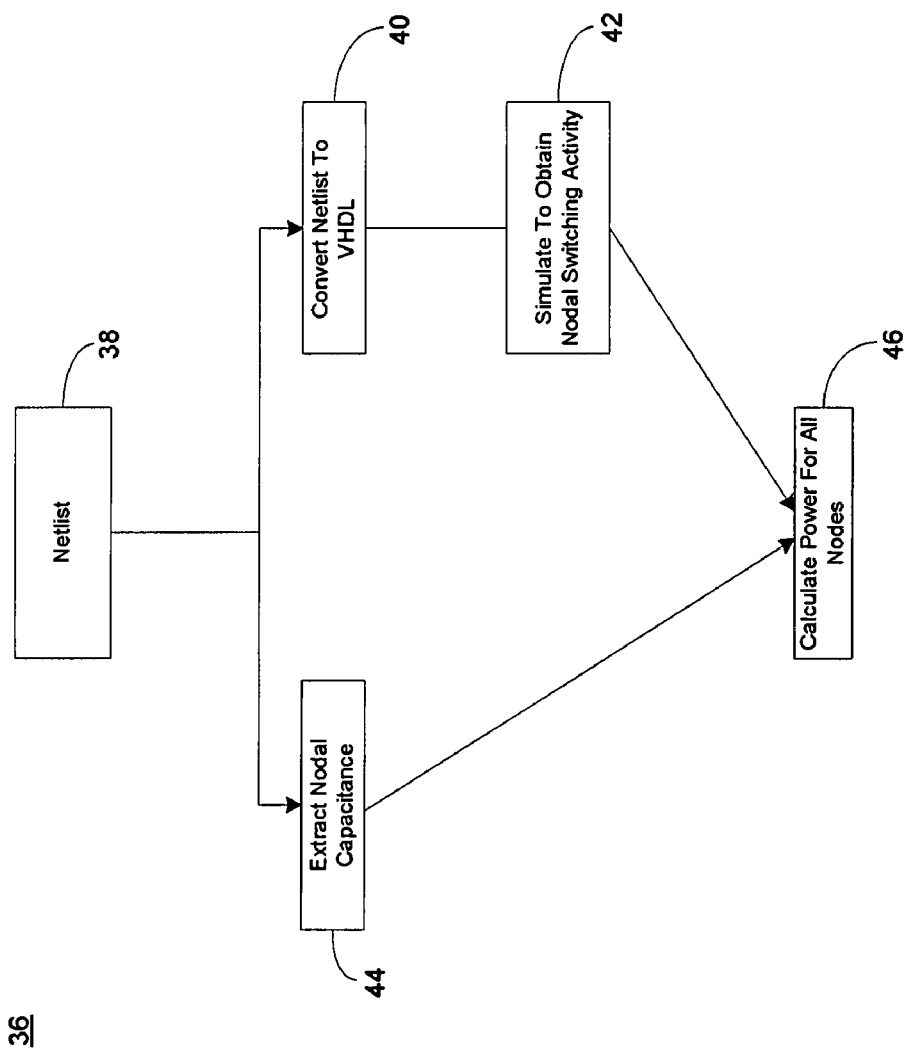
FIG. 2 shows a flow chart describing in more detail the calculating power operation shown in FIG. 1.

After the timing analysis, power that is dissipated from the circuit design represented by the netlist is calculated at 14. A more detailed description on how to calculate power is shown in FIG. 2. In particular, FIG. 2 shows a flow chart describing a process 36 associated with calculating power consumption. The process for calculating power consumption begins at 38 where the netlist is received. Once the netlist is received, process 36 begins by performing a functional simulation to ascertain how the netlist reacts in a real environment, i.e., how hardware that implements the design reacts in operating conditions. In particular, the functional simulation is interested in determining the switching activity that occurs at each node in the netlist.

These operations are described in FIG. 2 at 40 where the gate-level netlist is converted to a hardware description language such as VHDL. After converting the netlist to VHDL, a simulation is performed at 42 to obtain the switching activity at each node. Simulating the switching activity at each node occurs by incorporating the gate level netlist VHDL (VHDL netlist) into an existing simulation test bench used for verification. One or more test cases representing actual workload are run in this environment using either a cycle or event simulator such as Cadence™ NC-Sim or Synopsys™ VCS™. The simulator provides counts of how many times every node in the netlist vhdl transitions from a value of 0 to 1, or 1 to 0.

While the process 36 converts the netlist to VHDL and simulates nodal switching activity, it will also extract the nodal capacitance from the netlist at 44. After simulating nodal switching activity and extracting nodal capacitance, the process calculates power for all nodes in the netlist at 46. In particular, power is calculated by using the following formula:

$$Power = \tfrac{1}{2} FCV^2, \text{ wherein}$$

F=switching frequency of a source cell;

C=load capacitance driven by the source cell; and

V=total output voltage swing.

Referring back to FIG. 1, because the initial synthesis seldom generates a design that satisfies all of the specified constraints such as timing, area and power, changes to the circuit design are necessary. In one embodiment, modifications to the circuit design that close on timing, area and power constraints are made by using a tag list which lists all of the nodes in the netlist along with a tag that is specified for each node. The tag list can contain other items of data for each node. These other items of data are detailed below.

Once the tag list is created, a post synthesis is initiated. In particular, a plurality of nodes are selected to run the post synthesis process. In one embodiment, the worst case power consuming nodes from the netlist are selected. For example, if the netlist contains 1000 nodes, then the process 10 could select the top 200 worst case alternating current (AC) power consuming nodes to evaluate. Those skilled in the art will recognize that selecting the number of worst case AC power consuming nodes is user dependent and can contain as many nodes that the user wants to work on. After selecting the worst case AC power consuming nodes, the process 10 then optimizes each of the worst case nodes in an iterative manner based on nodal capacitance and nodal switching activity, while maintaining the specified timing and area constraints.

Referring back to FIG. 1, this process of selecting worst case power consuming nodes and optimizing the nodes in an iterative manner begins at 16, where a power list 17 is used to select a worst case power consuming node to work on (i.e., to optimize the node based on nodal capacitance and nodal switching activity, while maintaining the specified timing and area constraints). After selecting a node, then a power reduction algorithm is run on the selected node at 20. In particular, the power reduction algorithm is carried out through a refine process in synthesis wherein the nodes from the power list is given to the synthesis tool to work on for further modification. The operations include: change drive strength, change buffering structure, create/modify fanout tree, change placement, and structural refinement (simple to complex gate or vice versa). The power reduction algorithm maintains the original timing and area closure that was generated from the initial synthesis while performing these operations.

After the power reduction algorithm is run on the selected node, power is calculated at 22 in the manner described above. Next a determination is made at 24 to determine whether the reduced power generated from the power reduction algorithm adversely affected other design constraints such as timing and area constraints. If the design constraints are not satisfied (i.e., not okay), then the changes are discarded at 26. Although not explicitly shown in FIG. 1, a tag list 18 records that the selected node has undergone one iteration of being subjected to the power reduction algorithm, power calculation and timing and area determination. Moreover, the tag list 18 will record each time that the selected node goes through an iteration.

At 28, the process determines whether the selected node has been tagged to undergo more iterations. In one embodiment, each node in the tag list 18 contains a specified number of iterations to subject the node to the power reduction algorithm, power calculation and timing and area determination loop in instances where the power reduction adversely affects timing and area. For example, if a node has been tagged for three iterations, then three attempts can be allotted to work on the node to reduce power without adversely affecting timing and area. If it is determined at 28 that the selected node has more iteration allotments available, then the power reduction algorithm is re-run on the node at 20, power is calculated at 22 and timing and area are assessed at 24.

Alternatively, if it is determined at 28 that no more iteration allotments are available, then the process determines at 30 whether there are any more worst case power consuming nodes to evaluate. If there are more nodes to evaluate then the power list 17 is used to select the next node at 16. After selecting the next node, then the power reduction algorithm is run on the node at 20, power is calculated at 22 and timing and area are assessed at 24. Then the entry for the node in the tag list is updated.

If it is determined at 24 that the power reduction algorithm results in a positive effect, i.e., the timing and area are satisfied, then the power reduction change is accepted. If there are more worst case power consuming nodes to evaluate as determined at 34, then the power list 17 is used to select the next node at 16. Then after selecting the next node, the power reduction algorithm is run on the node at 20, power is calculated at 22 and timing and area are assessed at 24.

If there are no more worst case power consuming nodes to evaluate as determined at either decision blocks 30 and 34, then a final netlist representing the circuit design is generated at 32. As it has been shown herein, the power list 17 and tag list 18 function to ensure that only the worst case power consuming nodes are worked on and that all of these nodes are evaluated in a closed-loop manner, without ever getting caught in a never ending loop of evaluating the same node.

The foregoing flow charts shows some of the processing functions associated with an iterative synthesis of an integrated circuit design for power closure. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

The process operations described above can be implemented in an entirely hardware embodiment, an entirely software embodiment or an embodiment containing both hardware and software elements. In one embodiment, the process operations are performed on a general-purpose computer and are implemented in software, which includes but is not limited to firmware, resident software, microcode, etc.

In another embodiment, the process operations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the computer, instruction execution system, apparatus, or device. The computer readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Figure 3:
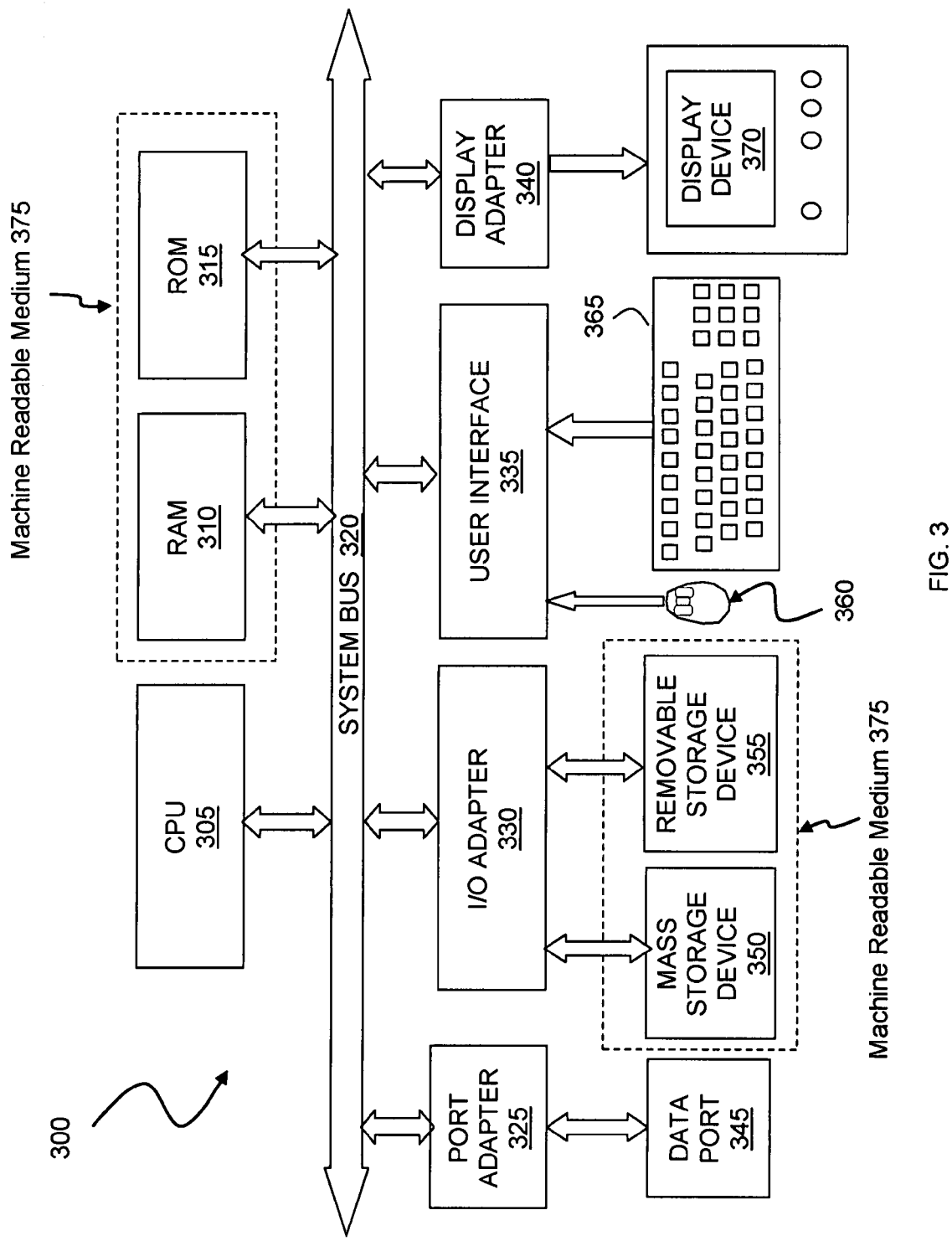
FIG. 3 shows a block diagram of a general-purpose computer system which can be used to implement a design structure embodied in a computer readable medium that can perform an iterative synthesis of an integrated circuit design to attain power closure while maintaining other design criteria as shown in FIGS. 1 and 2.

FIG. 3 shows a block diagram of a general-purpose computer system which can be used to implement a design structure embodied in a computer readable medium that can perform an iterative synthesis of an integrated circuit design to attain power closure while maintaining other design criteria as shown in FIGS. 1 and 2. The design structure may be coded as a set of instructions on removable or hard media for use by general-purpose computer. FIG. 3 is a schematic block diagram of a general-purpose computer for practicing the present invention. FIG. 3 shows a computer system 300, which has at least one microprocessor or central processing unit (CPU) 305. CPU 305 is interconnected via a system bus 320 to machine readable media 375, which includes, for example, a random access memory (RAM) 310, a read-only memory (ROM) 315, a removable and/or program storage device 355 and a mass data and/or program storage device 350. An input/output (I/O) adapter 330 connects mass storage device 350 and removable storage device 355 to system bus 320. A user interface 335 connects a keyboard 365 and a mouse 360 to system bus 320, and a port adapter 325 connects a data port 345 to system bus 320 and a display adapter 340 connects a display device 370. ROM 315 contains the basic operating system for computer system 300. Examples of removable data and/or program storage device 355 include magnetic media such as floppy drives, tape drives, portable flash drives, zip drives, and optical media such as CD ROM or DVD drives. Examples of mass data and/or program storage device 350 include hard disk drives and non-volatile memory such as flash memory. In addition to keyboard 365 and mouse 360, other user input devices such as trackballs, writing tablets, pressure pads, microphones, light pens and position-sensing screen displays may be connected to user interface 335. Examples of display device 370 include cathode-ray tubes (CRT) and liquid crystal displays (LCD).

A machine readable computer program may be created by one of skill in the art and stored in computer system 300 or a data and/or any one or more of machine readable medium 375 to simplify the practicing of this invention. In operation, information for the computer program created to run the present invention is loaded on the appropriate removable data and/or program storage device 355, fed through data port 345 or entered using keyboard 365. A user controls the program by manipulating functions performed by the computer program and providing other data inputs via any of the above mentioned data input means. Display device 370 provides a means for the user to accurately control the computer program and perform the desired tasks described herein.

Figure 4:
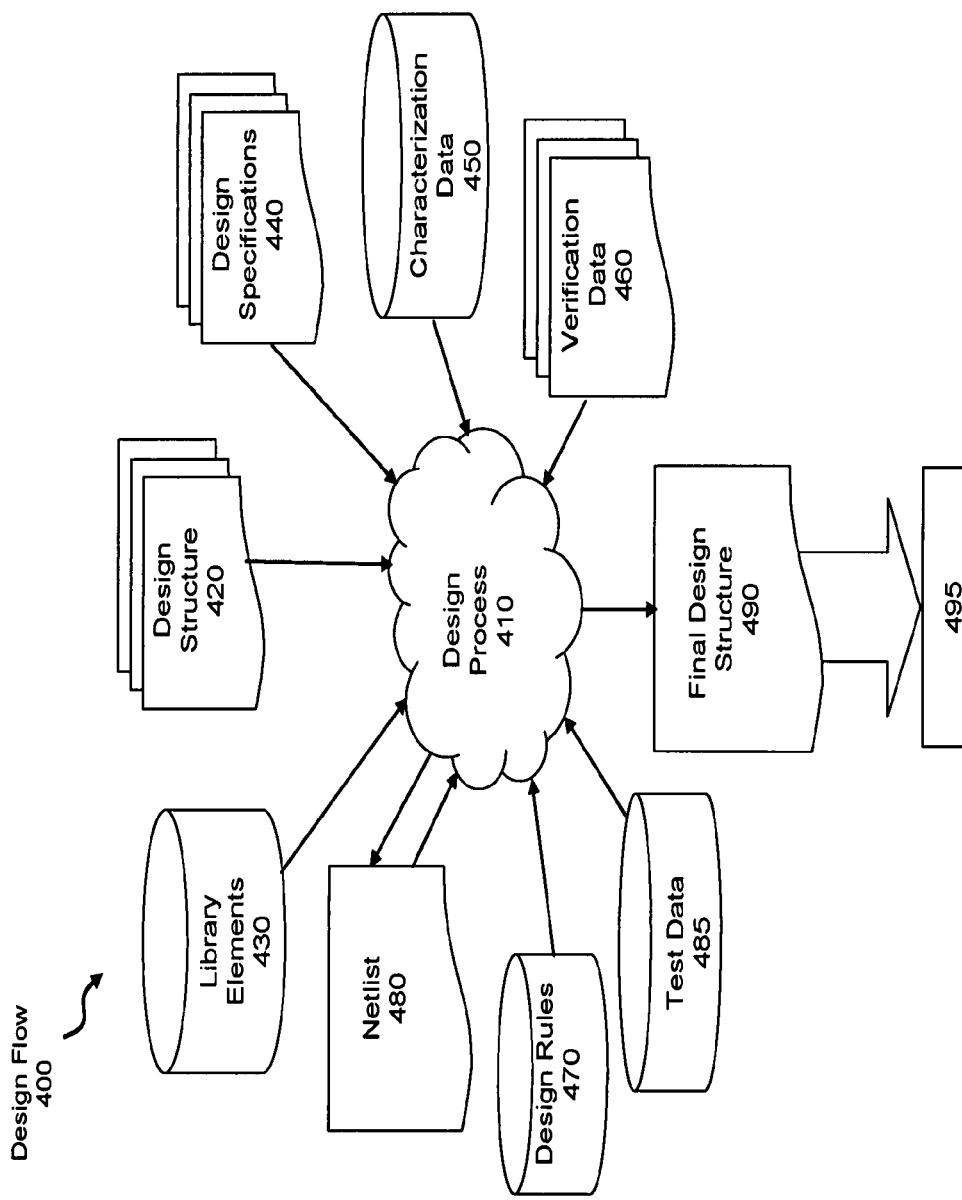
FIG. 4 shows a flow diagram describing a design process that can be used in the semiconductor design, manufacturing and/or test of the design structure that embodies the processes shown in FIGS. 1 and 2.

FIG. 4 shows a flow diagram describing a design process 400 that can be used in the semiconductor design, manufacturing and/or test of the design structure that embodies the processes shown in FIGS. 1 and 2. Design flow 400 may vary depending on the type of IC being designed. For example, a design flow 400 for building an application specific IC (ASIC) will differ from a design flow 400 for designing a standard component. Design structure 420 is an input to a design process 410 and may come from an IP provider, a core developer, or other design company. Design structure 420 embodies the functionalities shown in FIGS. 1 and 2 in the form of schematics or HDL, a hardware-description language, (e.g., Verilog, VHDL, C, etc.). Design structure 420 may be on one or more of machine readable medium 375 as shown in FIG. 3. For example, design structure 420 may be a text file or a graphical representation of the processes shown in FIGS. 1 and 2. Design process 410 synthesizes (or translates) the functionalities into a netlist 480, where netlist 480 is, for example, a list of wires, transistors, logic gates, control circuits, I/O, models, etc. and describes the connections to other elements and circuits in an integrated circuit design and recorded on at least one of machine readable medium 475.

Design process 410 includes using a variety of inputs; for example, inputs from library elements 430 which may house a set of commonly used elements, circuits, and devices, including models, layouts, and symbolic representations, for a given manufacturing technology (e.g. different technology nodes, 32 nm, 45 nm, 90 nm, etc.), design specifications 440, characterization data 450, verification data 460, design rules 470, and test data files 485, which may include test patterns and other testing information. Design process 410 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 410 without deviating from the scope and spirit of the invention.

Ultimately design process 410 translates functionalities described in FIGS. 1 and 2, along with the rest of the integrated circuit design (if applicable), into a final design structure 490 (e.g., information stored in a Graphic Database System (GDS) storage medium). Final design structure 490 may comprise information such as, for example, test data files, design content files, manufacturing data, layout parameters, wires, levels of metal, vias, shapes, test data, data for routing through the manufacturing line, and any other data required by a semiconductor manufacturer to generate the functionalities described in FIGS. 1 and 2. Final design structure 490 may then proceed to a stage 495 of design flow 400, where stage 495 is, for example, where final design structure 490 proceeds to tape-out, i.e., is released to manufacturing, is sent to another design house or is sent back to the customer.

It is apparent that there has been provided with this disclosure a design structure that performs iterative synthesis of an integrated circuit design to attain power closure. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A design structure embodied in a computer readable storage medium, which when executed by a computer system, performs an iterative synthesis of an integrated circuit design to attain power closure while maintaining other design criteria, the design structure comprising:
   program code for performing an initial synthesis of the integrated circuit design to generate a netlist containing a listing of circuits and interconnections that form the integrated circuit design;
   program code for generating a tag list that specifies a tag for each node in the netlist;
   program code for identifying a predetermined number of nodes from the netlist that are representative of worst case power consuming nodes;
   program code for performing a power reduction algorithm on each of the predetermined number of nodes;
   program code for calculating power of the netlist after each instance that a power reduction algorithm is run on a node selected from the predetermined number of nodes;
   program code for determining after each instance that a power reduction algorithm is run on a node selected from the predetermined number of nodes whether the netlist satisfies design constraints specified for the integrated circuit design;
   program code for using the tag list to iterate through the performing of a power reduction algorithm, calculating of power and determining of whether the netlist satisfies specified design constraints for each of the predetermined number of nodes; and
   program code for generating a final netlist after all of the predetermined number of nodes have been iterated through the performing of a power reduction algorithm, calculating of power and determining of whether the netlist satisfies specified constraints.

2. The design structure of claim 1, wherein a final design structure comprises a netlist which describes the design structure.

3. The design structure of claim 1, wherein a final design structure resides on a Graphic Database System (GDS) storage medium.

4. The design structure of claim 1, wherein a final design structure includes test data files, characterization data, verification data or design specifications.

5. The design structure of claim 1, wherein the performing program code comprises program code for maintaining original timing and area closure generated from the initial synthesis while running the power reduction algorithm.

6. The design structure of claim 1, wherein the performing program code comprises program code for optimizing AC power based on nodal capacitance and nodal switching while maintaining design constraints.

7. The design structure of claim 1, wherein the using program code comprises program code for tracking each instance that one of the predetermined nodes has been iterated through the performing of a power reduction algorithm, calculating of power and determining of whether the netlist satisfies specified timing and area constraints.

* * * * *